US011005928B2

(12) United States Patent
Mahajan et al.

(10) Patent No.: US 11,005,928 B2
(45) Date of Patent: May 11, 2021

(54) RESILIENCE IN NATIVELY NON-HIGH AVAILABILITY SERVICES

(71) Applicant: SAP SE, Walldorf (DE)

(72) Inventors: Sushant Mahajan, Karnataka (IN); Abhijit Gharami, Odisha (IN)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 16/363,610

(22) Filed: Mar. 25, 2019

(65) Prior Publication Data

US 2020/0314176 A1  Oct. 1, 2020

(51) Int. Cl.
*H04L 29/08* (2006.01)
*H04L 12/24* (2006.01)

(52) U.S. Cl.
CPC ........ *H04L 67/1034* (2013.01); *H04L 41/069* (2013.01); *H04L 41/0681* (2013.01); *H04L 41/082* (2013.01); *H04L 67/1095* (2013.01); *H04L 67/1097* (2013.01)

(58) Field of Classification Search
CPC ............... H04L 67/1034; H04L 41/082; H04L 67/1097; H04L 41/0681; H04L 41/069; H04L 67/1095
USPC ....................................................... 714/4.11
See application file for complete search history.

(56) References Cited

U.S. PATENT DOCUMENTS

2020/0053419 A1* 2/2020 Van Deventer ............................ H04N 21/25808

OTHER PUBLICATIONS

Wikipedia "Raft" p. from date Jan. 21, 2019, retreved using the Way Back Machine from https://web.archive.org/web/20190121164611/https://en.wikipedia.org/wiki/Raft_(computer_science) (Year: 2019).*

* cited by examiner

*Primary Examiner* — Yair Leibovich
(74) *Attorney, Agent, or Firm* — Buckley, Maschoff & Talwalkar LLC (57) ABSTRACT

Some embodiments provide a system and method associated with improving resilience for a non-high availability service provided by a multi-node cluster (e.g., a bosh-based database service). A processor of a node in the cluster may determine that a lifecycle event has occurred (e.g., an initial deployment, failover, or deployment update). Responsive to the lifecycle event, the processor may store information about a role of a master node and timestamp information (e.g., on persistent storage). The processor may subsequently determine that a cluster deployment crash has occurred for the service. Timestamp information associated with multiple nodes may then be compared to establish one of the nodes as the master node. For example, the most recent timestamp may be used to establish the master node.

20 Claims, 10 Drawing Sheets

RESILIENCE IN NATIVELY NON-HIGH AVAILABILITY SERVICES

FIELD

Some embodiments are associated with natively non-high availability services. In particular, some embodiments provide improved resiliency for natively non-high availability services.

BACKGROUND

Some cloud platform services are natively non-high availability but may still be very relevant for users. A database service is one example of such a service. The pre-cloud era databases, such as ones associated with Postgre Structured Query Language ("PostgreSQL") processes, do not support running a highly available cluster. However, these services do generally provide a mechanism to create a master/slave setup so that there can be a single master node capable of read and write operations and one or more slaves which are only capable of read operations. These slaves are usually synchronized with the master in an asynchronous fashion. It is the responsibility of the service provider to create appropriate scripts/programs that allow a slave to become the master when the original master node crashes or goes down for any reason. This process is referred to herein as a "failover."

A failover is usually accomplished by an intricate tandem of scripts running on all nodes that hosting the database or data service processes. When the entire deployment of a database or data service instance goes down (e.g., because of a data center failure or a quota issue), the deployment might not return to a healthy state. This means that a slave node (which was not in perfect synchronization with the original master node) might be established as the new master node. Consider, for example, FIG. 1 which illustrates 100 a potential problem when a deployment crashes. In particular, a service is provided via a cluster 110 having multiple nodes 111, 112. The first node 111 is initially established as the master ("M") node and the second node is established as a slave ("S") node for the cluster 110. Upon on overall deployment crash, the cluster 120 may now (based on any heuristic for assigning a master in an initial deployment) again have the first node as the master and the second node as a slave. If, however, a failover occurs because of some problem with the first node, the cluster 130 will establish the first node as a slave and the second node as the master. Now if a deployment crash occurs, it is possible (with no other information) that the cluster 140 will incorrectly arrange for the first node to become the master while the second node is made a slave. As a result, data loss might occur or, in other cases, no master node might even be established. To solve these problems, some manual intervention is generally required. It may therefore be desirable to provide systems and methods to automatically improve resilience for natively non-high availability services in an accurate and efficient manner.

SUMMARY OF THE INVENTION

According to some embodiments, systems, methods, apparatus, computer program code and means are provided to automatically improve resilience for natively non-high availability service in an accurate and efficient manner. A processor of a node in the cluster may determine that a lifecycle event has occurred (e.g., an initial deployment, failover, or deployment update). Responsive to the lifecycle event, the processor may store information about a role of a master node and timestamp information (e.g., on persistent storage). The processor may subsequently determine that a cluster deployment crash has occurred for the service. Timestamp information associated with multiple nodes may then be compared to establish one of the nodes as the master node. For example, the most recent timestamp may be used to establish the master node.

Some embodiments comprise: means for determining that a lifecycle event has occurred; responsive to the lifecycle event, means for storing information about a role of a master node and timestamp information; means for determining that a cluster deployment crash has occurred for the service; and means for comparing timestamp information associated with multiple nodes to establish one of the nodes as the master node.

In some embodiments, a communication device associated with a multi-node cluster exchanges information in connection with one or more interactive graphical user interfaces. The information may be exchanged, for example, via public and/or proprietary communication networks.

Technical effects of some embodiments of the invention are improved and computerized ways to automatically improve resilience in natively non-high availability services in an accurate and efficient manner. With these and other advantages and features that will become hereinafter apparent, a more complete understanding of the nature of the invention can be obtained by referring to the following detailed description and to the associated drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 2:
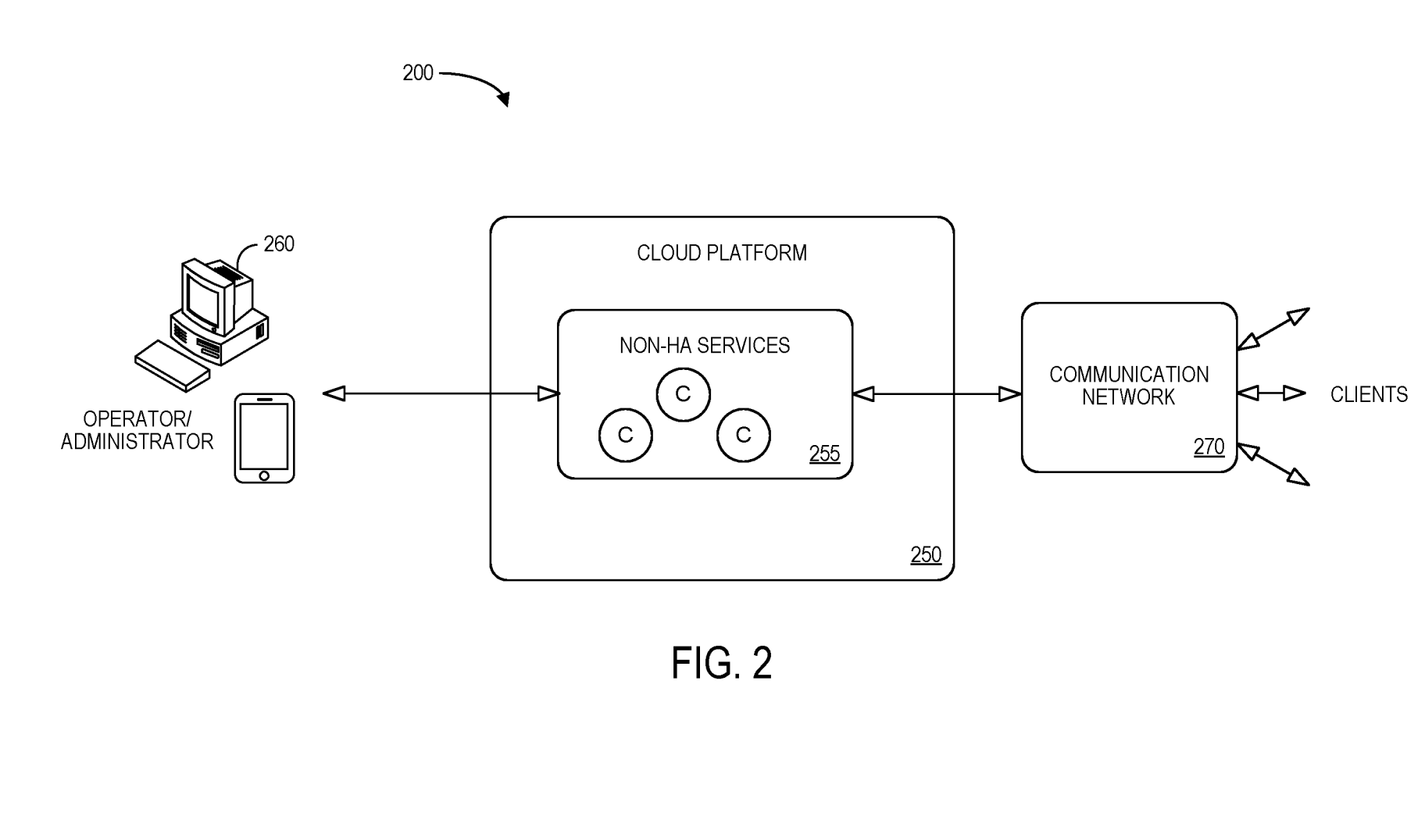
FIG. 2 is a block diagram of a resilience improvement system according to some embodiments.

FIG. 2 is a block diagram of a resilience improvement system 200 according to some embodiments. In particular, the system 200 includes a cloud platform 250 with non-High Availability ("non-HA") services 255 executing on multi-node clusters C and a remote operator or administrator computer 260. The cloud platform 250 may, according to some embodiments, implement a bosh-based service. As used herein, the phrase "bosh-based" may refer to a tool chain for release engineering, deployment, and life-cycle management of large-scale distributed services. The tool chain may include a server (a bosh director) and a command line tool to package, deploy, and/or manage cloud software to provide a service. When a failover or deployment crash is detected, the clusters C may access locally stored timestamp information (or access a third-party data store) to implement an appropriate recovery and master/slave designation process. The cloud platform 250 might be, for example, associated with a Personal Computers ("PC"), laptop computer, an enterprise server, a server farm, and/or a database or similar storage devices.

As used herein, devices, including those associated with the cloud platform 250 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. According to some embodiments, an "automated" cloud platform 250 may improve resilience for natively non-high availability services. As used herein, the term "automated" may refer to, for example, actions that can be performed with little or no human intervention.

The cloud platform 250 may store information into and/or retrieve information from databases. The databases might be, for example, locally stored relational database or reside physically remote from the cloud platform 250. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical operator interface may provide an ability to access and/or modify elements of the system 200 via remote devices 260. The operator interface might, for example, let an operator or administrator monitor resilience performance values, audit system state changes, etc.

Note that any number of multi-node clusters C might be included in the system 200 and each cluster C might include any number of nodes. Moreover, various devices described herein might be combined according to embodiments of the present invention. For example, in some embodiments, the cloud platform 250 and the remote operator or administrator computer 260 might be co-located and/or may comprise a single apparatus. Moreover, the functions described herein might be implemented in a cloud-based environment and/or by a service provider (e.g., performing services for one or more enterprises, departments, or businesses).

Figure 3:
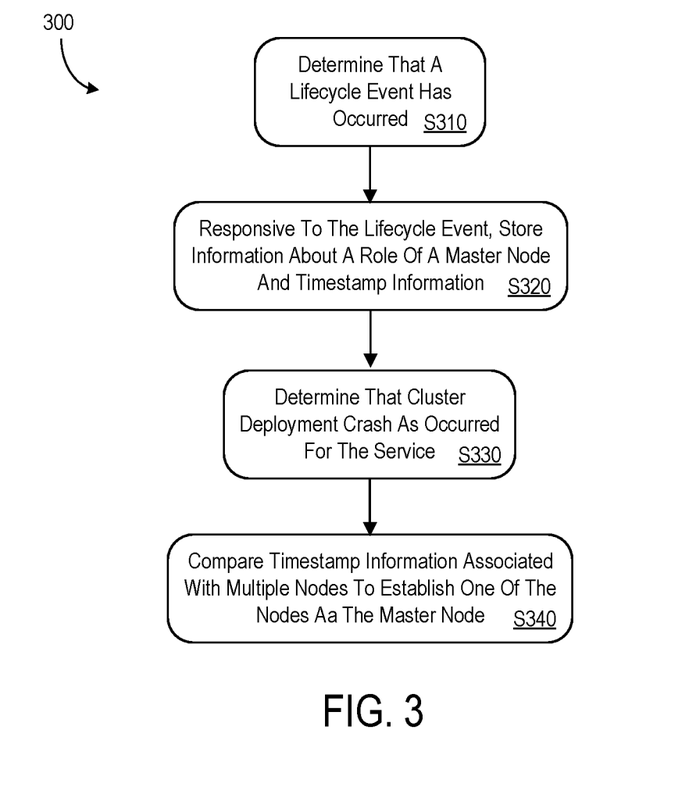
FIG. 3 illustrates a resilience improvement method according to some embodiments.

FIG. 3 illustrates a resilience improvement method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The method 300 may improve resilience for a non-high availability service provided by a multi-node cluster. The non-high availability service might comprise, for example, a bosh-based service. According to some embodiments, the bosh-based service is associated with a database such as one providing a database or data service (e.g., PostgreSQL-as-a-service). At S310, the system may determine that a lifecycle event has occurred. The lifecycle event might be associated with, for example, an initial first-time deployment, a failover occurrence, or a deployment update.

Responsive to the lifecycle event, at S320 the system may store information about a role of a master node and timestamp information. The time stamp information might comprise, for example, a plaintext Coordinated Universal Time ("UTC") timestamp. According to some embodiments, the timestamp information is stored on a persistent storage device such that it survives across reboots and crashes.

At S330, the system may determine that a cluster deployment crash has occurred for the service. At S340, the system may compare timestamp information associated with multiple nodes to establish one of the nodes as the master node. This process is explained in more detail with respect to FIGS. 4 through 6. According to some embodiments, the timestamp information is further used auditing and prediction model building purposes by cross-referencing it with appropriate log events.

Figure 1:
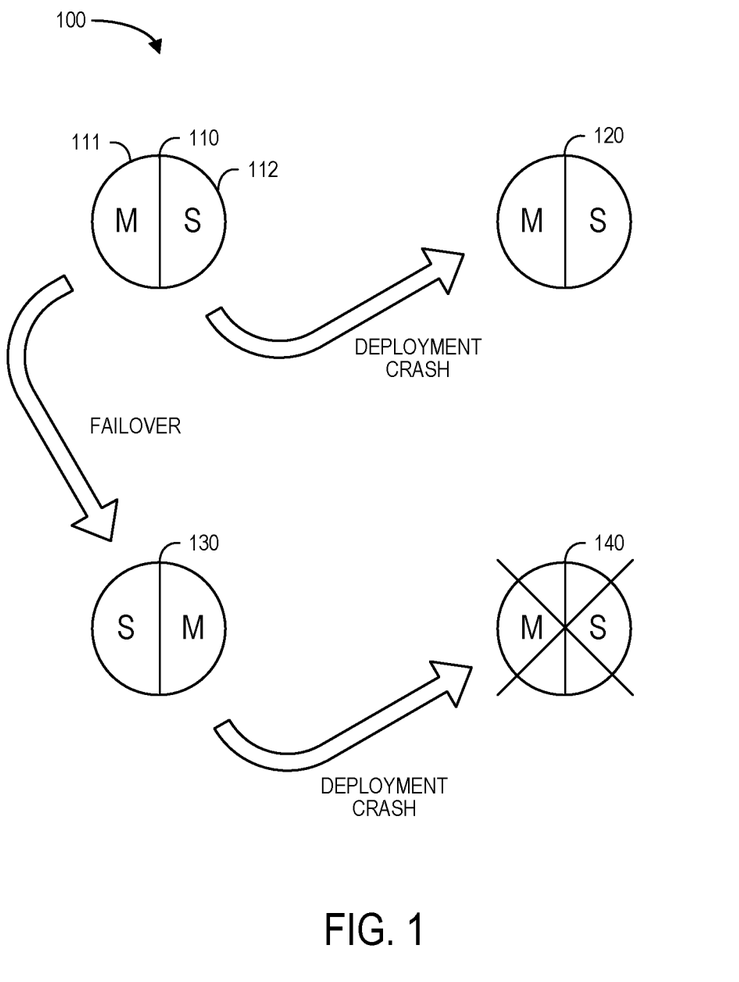
FIG. 1 illustrates a potential problem when a deployment crashes.

The problems described in connection with FIG. 1 are a result of nodes not being able to correctly determine the state of the cluster before a catastrophic event occurs. Some embodiments described herein leverage existing infrastructure code for a bosh-based deployment along with some timing information to correctly determine which node should become the master node and which ones should be establishes as slave nodes.

For simplicity, the examples described herein assume a two-node cluster with one master node and one slave node (although embodiments might instead be implemented using three or more nodes). Note that there are certain events in the normal lifecycle of a deployment which can be used to store information about the role of a node. The system may then use this information to assign the correct role to the correct node when a failure occurs. Three events of importance include:

Event (1): When a deployment comes up for the first time. Generally, at this time no information about the previous roles of a node are known. Instead, any heuristic can be used to deem one node as master and the other as slave. For example, the node with a lower IP address might be pre-destined to become the master. However, the timestamp file should be updated with the appropriate timestamp.

Event (2): When a regular failover occurs and a slave node is promoted to become the master node.

Event (3): When a deployment is updated. As will be explained, this event may be subsumed in event (2).

Figure 4:
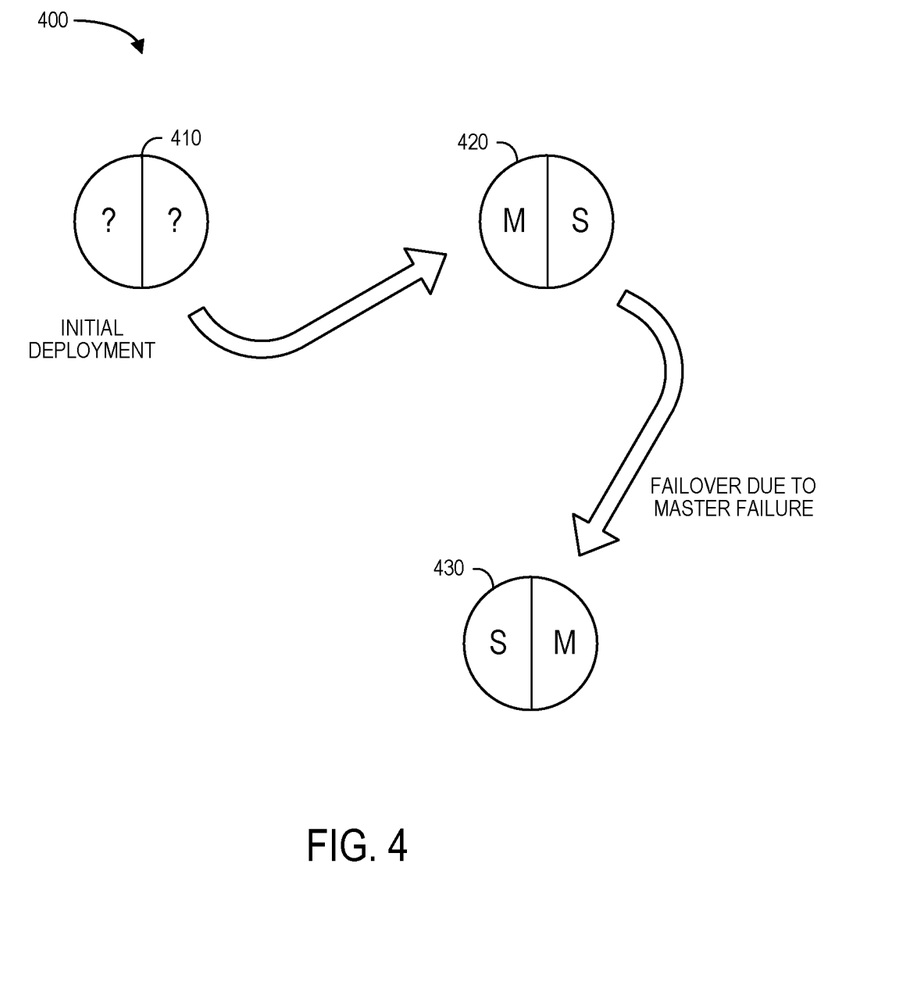
FIG. 4 illustrates the recordation of timestamp information in accordance with some embodiments.

There are certain scripts that run when these events occur. It is here that the system may store some additional information. According to some embodiments, the scripts may be modified such that a current UTC timestamp in seconds is appended to a simple plaintext file. FIG. 4 illustrates 400 the recordation of timestamp information during an initial deployment (Event (1)) in accordance with some embodiments. Upon initial deployment, the two nodes of the cluster 410 are not yet assigned a master or slave mode (represented by "?" in FIG. 4). After normal startup processing it is decided that a first node of the cluster 420 is the master while the second node is a slave. At this point, the first node (as master) appends the current UTC timestamp to a locally stored file. After a failure caused by a problem with the first node, it is determined that the second node of the cluster 430 will become the master and the first node will become the slave. The second node (as master) now appends the current UTC timestamp to a locally stored file.

According to some embodiments, this file resides on a persistent storage device such that the information survives across reboots and deployment crashes. The system may store this information on the node that is getting promoted in event (2) or has been determined to become the master node in event (3). Note that event (3) may be subsumed in event (2) because two separate failovers happen naturally during a deployment update.

Note that when a normal failover happens (e.g., the master node goes down for some reason), the stored timing information is not consulted and the deployment runs as normal. As a result, no extra time penalty is incurred. As is always the case, whatever node ends up becoming the master appends the current timestamp to the file.

When a catastrophic event happens (and the entire deployment goes down), then the stored timing information is consulted. In the pre-start scripts, the node which is coming up makes a call to the opposite node (assuming the nodes of the cluster can communicate with each other). This can be a HyperText Transfer Protocol ("HTTP") call or some other protocol that the service provider deems appropriate. If this call fails, this node will become a slave. In a worst-case scenario, the system might end up with two slaves (but there is no chance of data loss). If the opposite node is not up yet, then this node simply becomes a slave and only allows reads. When the opposite node comes up, it will be that node's responsibility to correctly determine which node is the master. The expected response of this HTTP call will be a timestamp. If the opposite node never became a master throughout the history of the deployment, then it will not have any time information (since none of the aforementioned events occurred for that node). Thus, it should reply with a simple "0." In this case, the node which is coming up compares the fetched value and its own value to see which timestamp is more recent. If the node's timestamp is more recent, then it becomes the master and the opposite node continues working as a slave.

Figure 5:
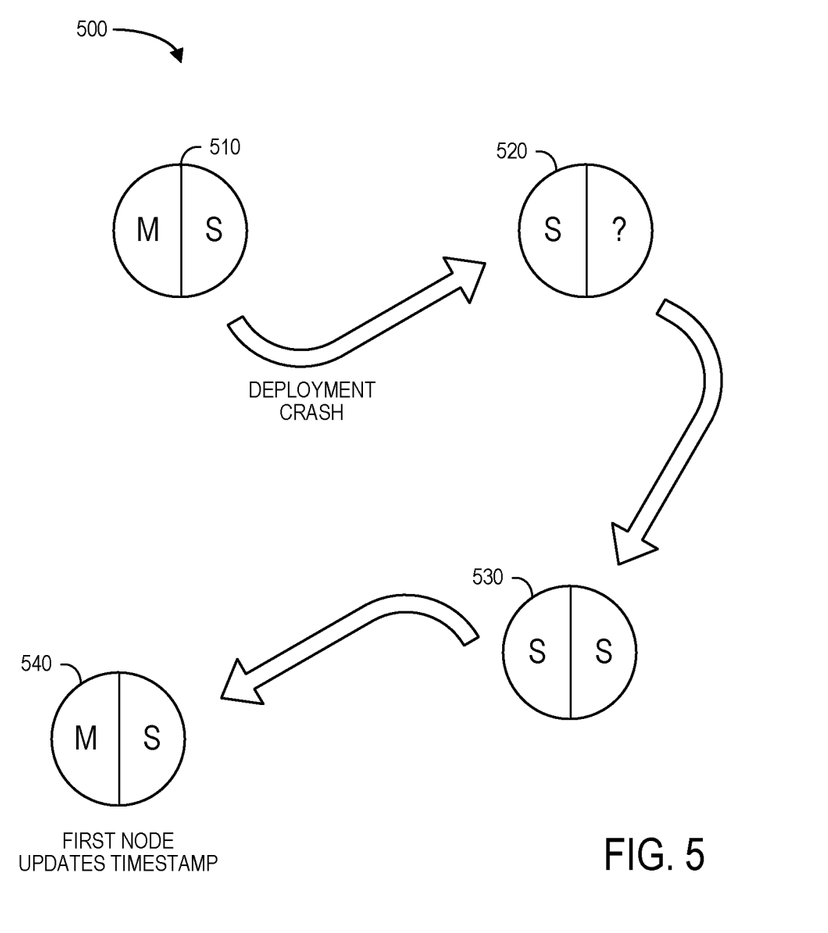
FIG. 5 illustrates a first node master situation according to some embodiments.

FIG. 5 illustrates 500 a first node master situation according to some embodiments. Initially, the first node of a cluster 510 acts as the master and a second node acts as a slave. Upon a deployment crash, the first node of the cluster 520 comes up but—because the second node is not yet up (and is therefore "?"), the first node remains a slave. When the second node comes up, it checks the most recent timestamp of the first node. Before the crash, the first node was the master and therefore it will have the most recent timestamp. When the second node waits to learn the most recent timestamp of the first node, it makes itself a slave in the cluster 530. When the second node receives the most recent timestamp from the first node, it now knows all of the information needed to make a decision. Because the first node's most recent timestamp is newer than any timestamp of the second node, the second node asks the first node to promote itself to be the master of the cluster 540. At this point, the first node locally records the current timestamp. That is, when it is found that the opposite node has a more recent timestamp, then a node calls another endpoint on the opposite node and asks it to promote itself. That is, the system assumes a failover mechanism to be in place (and the code to accomplish this should already be present).

Figure 6:
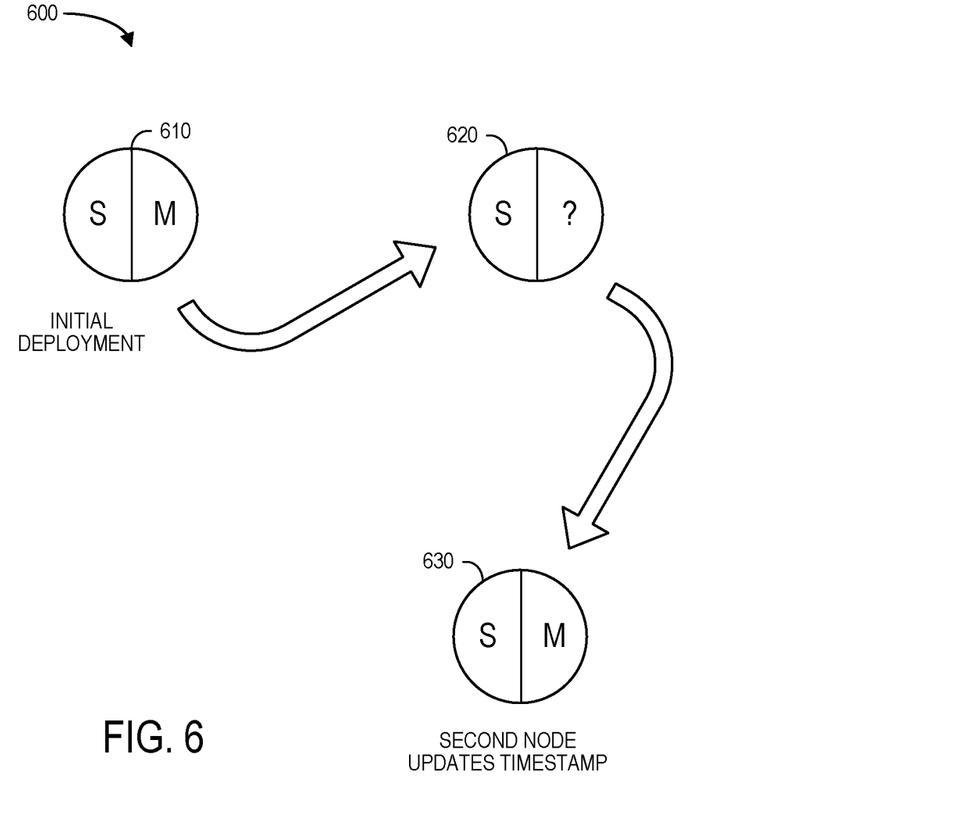
FIG. 6 illustrates a second node master situation in accordance with some embodiments.

FIG. 6 illustrates 600 a second node master situation in accordance with some embodiments. In this example, the first node of a cluster 610 acts as a slave and a second node acts as a master. As before, upon a deployment crash the first node of the cluster 620 comes up but—because the second node is not yet up (and is therefore "?"), the first node remains a slave. When the second node comes up, it checks the most recent timestamp of the first node. Before the crash, the second node was the master and therefore it will have the most recent timestamp. Because the second node's most recent timestamp is newer than any timestamp of the first node, the second node promotes itself to be the master of the cluster 630 (and the first node is a slave). At this point, the second node locally records the current timestamp.

Note that timestamps may be appended to a text file on some persistent storage area on the disk. According to some embodiments, timestamp information might be represented by a series of UTC values in a text file as follows:
 1539677036
 1539677041
 1539677046
 1539677051

To determine an appropriate role for a node in the cluster, the system might only concern itself with the last value in the text file since it is the most recent time at which the node in question became the master node.

Thus, timestamp information may improve resilience for a natively non-high availability service. This information in the timestamp files can also be used for auditing and prediction model building purposes by cross referencing it with appropriate log events. This approach may even be extended to many services with little or no changes. There is no substantial external dependency on the system when using some embodiments described herein (as opposed to using a third-party cache to store the timing information). Since multiple nodes are consulted before taking any action, the system has a high degree of integrity associated with the decision. In some embodiments, the timestamp information is stored on a third-party central key value store. When only one node comes up it can query the timestamp information from the store and decide whether or not to become the master node. This optimization may help improve the efficiency of the system's operation.

Figure 7:
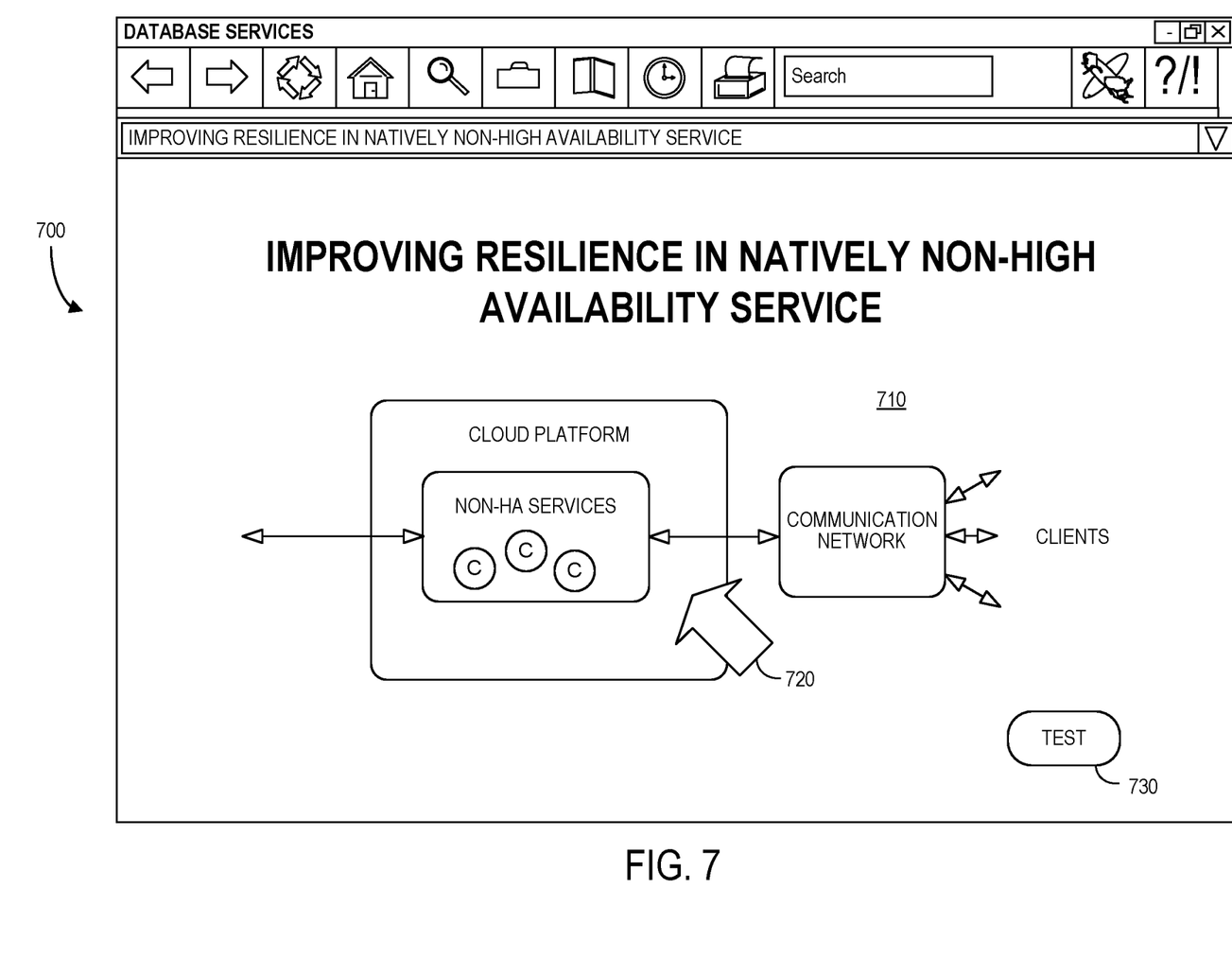
FIG. 7 is a user interface display according to some embodiments.

In some cases, an operator or administrator may monitor and/or adjust parameters associated with embodiments described herein. For example, FIG. 7 illustrates an interactive Graphical User Interface ("GUI") display 700 that might display information about a system according to some embodiments. The display 700 includes a graphic representation 710 of elements of a system (e.g., a cloud platform, non-HA services, clusters, etc.). Selection of portions of the graphic representation 710 (e.g., by touchscreen or computer mouse pointer 750) may result in the display of additional information about an element and/or allow an operator to adjust a parameter associated with the data center. Similarly, selection of a "Test" icon 730 may also let the user perform failovers tests for the cloud platform (e.g., to see how various failures, deployments, updates, etc. might result in new master/slave configurations for different clusters).

Figure 8:
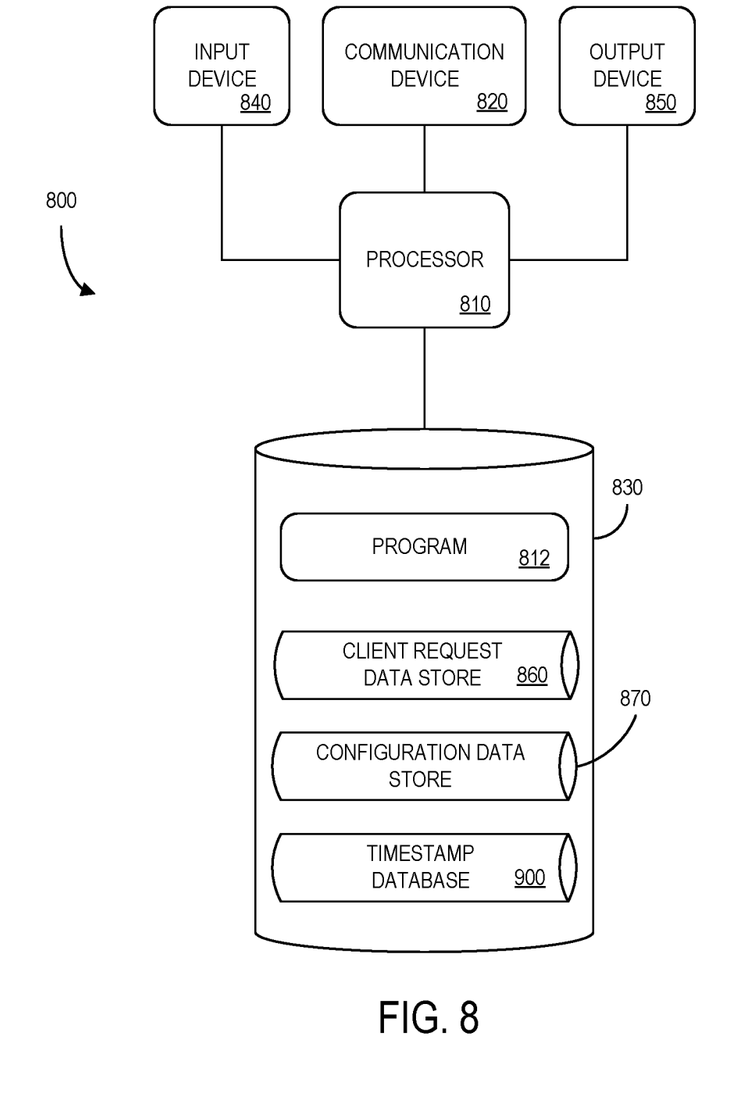
FIG. 8 is a high-level diagram of an apparatus or platform in accordance with some embodiments.

The embodiments described herein may be implemented using any of a number of different computer hardware implementations. FIG. 8 is a block diagram of apparatus 800 according to some embodiments (e.g., the system 200 of FIG. 2). The apparatus 800 may comprise a general-purpose computing apparatus and may execute program code to perform any of the functions described herein. The apparatus 800 may include other unshown elements according to some embodiments. According to some embodiments, the apparatus 800 includes a processor 810 operatively coupled to a communication device 820, a data storage device 830, one or more input devices 840, and/or one or more output devices 850. The communication device 820 may facilitate communication with external devices, such as remote user or administrator devices. The input device(s) 840 may comprise, for example, a keyboard, a keypad, a mouse or other pointing device, a microphone, knob or a switch, an Infra-Red ("IR") port, a docking station, and/or a touch screen. The input device(s) 840 may be used, for example, to enter information into the apparatus 800 (e.g., about failover processes, timestamp storage options, etc.). The output device(s) 850 may comprise, for example, a display (e.g., a display screen) a speaker, and/or a printer (e.g., to provide resilience improvement status to an operator, summary analytic reports, troubleshooting information, etc.).

The data storage device 830 may comprise any appropriate persistent storage device, including combinations of magnetic storage devices (e.g., magnetic tape, hard disk drives and flash memory), optical storage devices, Read Only Memory ("ROM") devices, etc., while the memory 860 may comprise Random Access Memory ("RAM").

The program code 812 may be executed by the processor 810 to cause the apparatus 800 to perform any one or more of the processes described herein. Embodiments are not limited to execution of these processes by a single apparatus. The data storage device 830 may also store data and other program code for providing additional functionality and/or which are necessary for operation thereof, such as device drivers, OS files, etc. For example, the processor 810 may improve resilience for a non-high availability service provided by a multi-node cluster, including at least one master node and at least one slave node. The processor 810 may determine that a lifecycle event has occurred (e.g., an initial deployment, failover, or deployment update). Responsive to the lifecycle event, the processor 810 may store information about a role of a master node and timestamp information (e.g., on persistent storage). The processor 810 may subsequently determine that a cluster deployment crash has occurred for the service. Timestamp information associated with multiple nodes may then be compared by the processor 810 (and/or a processor associated with another node) to establish one of the nodes as the master node. For example, the most recent timestamp may be used by the processor 810 to establish the master node.

In some embodiments (such as shown in FIG. 8), the storage device 830 further stores a client request database 860 (e.g., containing audit log about database requests received from various clients), a configuration data store 870 (e.g., containing information about various state changes, lifecycle events, etc.), and a timestamp database 900. An example of a database that may be used in connection with the apparatus 800 will now be described in detail with respect to FIG. 9. Note that the database described herein is only one example, and additional and/or different information may be stored therein. Moreover, various databases might be split or combined in accordance with any of the embodiments described herein.

Figure 9:
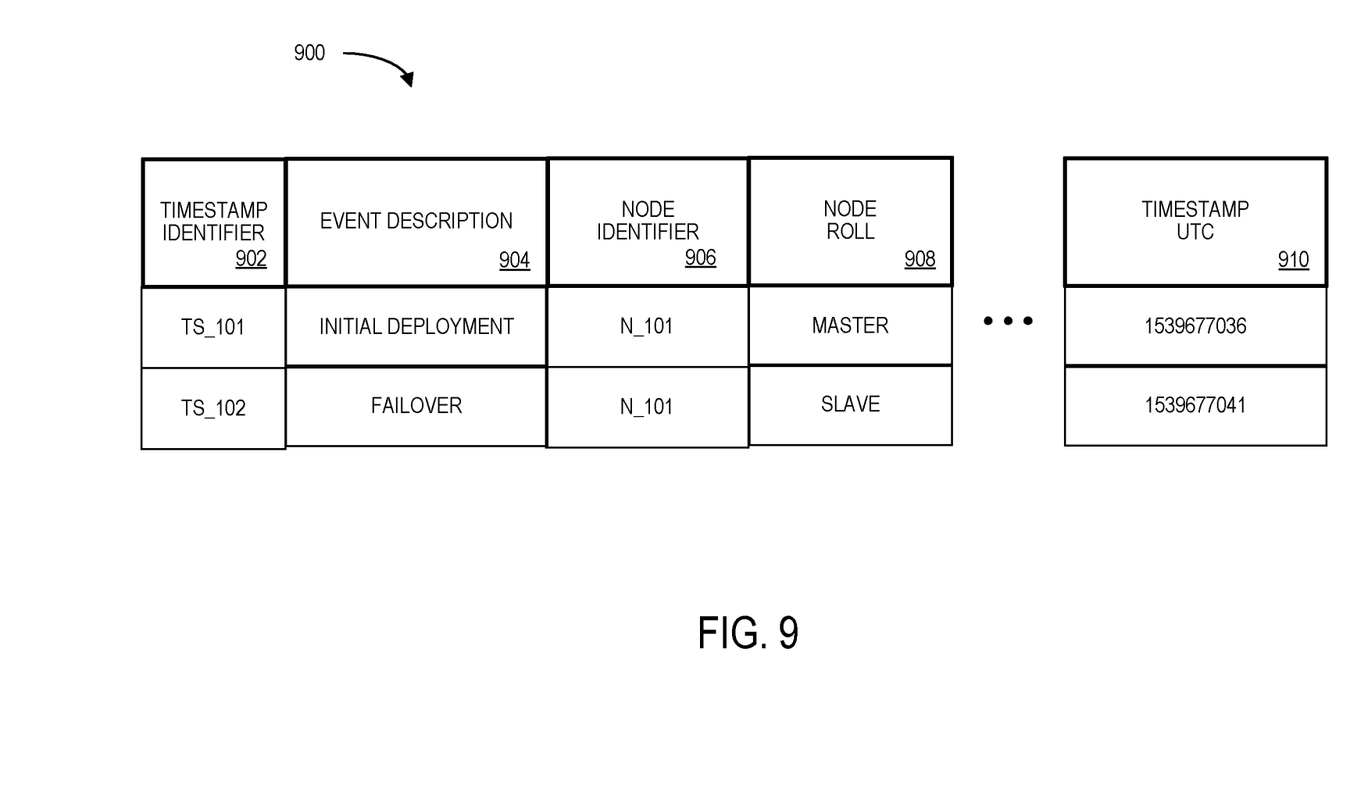
FIG. 9 is a portion of a resilience improvement database according to some embodiments.

Referring to FIG. 9, a table is shown that represents the timestamp database 900 that may be stored at the apparatus 800 according to some embodiments. The table may include, for example, entries identifying timestamps that have been recorded by the system. The table may also define fields 902, 904, 906, 908, 910 for each of the entries. The fields 902, 904, 906, 908, 910 may, according to some embodiments, specify: a timestamp identifier 902, an event description 904, a node identifier 906, a node role 908, and a timestamp UTC 910. The timestamp database 900 may be created and updated, for example, based on information received from a node in a multi-node cluster.

The timestamp identifier 902 may be, for example, a unique alphanumeric code identifying a lifecycle event that occurred with respect to a particular node in a cluster. The event description 904 describes the details of the lifecycle event. The node identifier 906 might identify a particular node in a multi-node cluster, and the node role 908 might indicate if that particular node was acting a master or slave when the database 900 entry was recorded. The timestamp UTC 910 might comprise a text string representing a time value (in seconds or any other period) associated with a universal time standard. According to some embodiments, Greenwich Mean Time ("GMT") values could be used to store time values.

In this way, embodiments may improve resilience in natively non-high availability services. Moreover, some or all of the embodiments described herein may be used (along with information in related log files) to track a history of deployments in terms of state changes.

Figure 10:
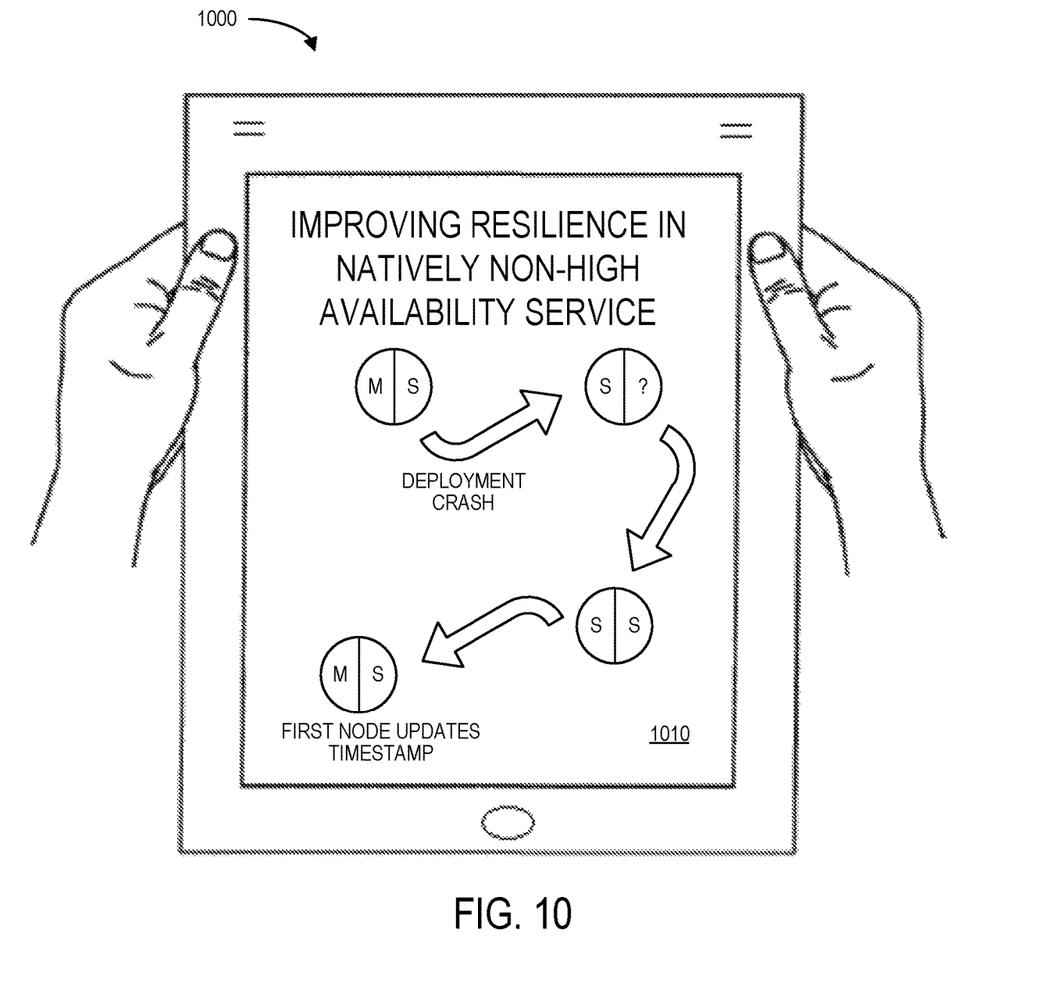
FIG. 10 illustrates a handheld tablet computer in accordance with some embodiments.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein. Moreover, the displays described are provided only as examples and other types of displays might be implemented. For example, FIG. 10 shows a handheld tablet computer 1000 in accordance with some embodiments. A display 1010 might provide information about the changing states of a multi-node cluster and one or more icons may be selected by the user to adjust operation of the system (e.g., by initiating a test failure, changing heuristics, etc.).

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system to improve resilience, comprising:
   for each node in a non-high availability bosh-based service provided by a multi-node cluster, a processor and instructions adapted to:

(i) determine that a lifecycle event has occurred,
(ii) responsive to the lifecycle event, store information about a role of a master node and timestamp information,
(iii) determine that a cluster deployment crash has occurred for the service, and
(iv) compare timestamp information associated with multiple nodes to establish one of the nodes as the master node.

2. The system of claim 1, wherein the bosh-based service is associated with a database.

3. The system of claim 2, wherein the bosh-based service is associated with a database or data service.

4. The system of claim 1, wherein the lifecycle event is associated with at least one of: (i) an initial first-time deployment, (ii) a failover occurrence, and (iii) a deployment update.

5. The system of claim 1, wherein the timestamp information comprises a plaintext Coordinated Universal Time ("UTC") timestamp.

6. The system of claim 1, wherein the timestamp information is stored on a persistent storage device such that it survives across reboots and crashes.

7. The system of claim 1, wherein the timestamp information is further used auditing and prediction model building purposes by cross-referencing it with appropriate log events.

8. The system of claim 1, wherein the timestamp information is stored via a third-party central key value store.

9. A method to improve resilience, comprising:
determining that a lifecycle event has occurred in a non-high availability bosh-based service provided by a multi-node cluster;
responsive to the lifecycle event, storing information about a role of a master node and timestamp information;
determining that a cluster deployment crash has occurred for the service; and
comparing timestamp information associated with multiple nodes to establish one of the nodes as the master node.

10. The method of claim 9, wherein the bosh-based service is associated with a database.

11. The method of claim 9, wherein the lifecycle event is associated with at least one of: (i) an initial first-time deployment, (ii) a failover occurrence, and (iii) a deployment update.

12. The method of claim 9, wherein the timestamp comprises a plaintext Coordinated Universal Time ("UTC") timestamp.

13. The method of claim 9, wherein the timestamp information is stored on a persistent storage device such that it survives across reboots and crashes.

14. The method of claim 9, wherein the timestamp information is further used auditing and prediction model building purposes by cross-referencing it with appropriate log events.

15. The method of claim 9, wherein the timestamp information is stored via a third-party central key value store.

16. A non-transitory, computer-readable medium storing program code, the program code executable by a computer processor to cause the processor to perform a method to improve resilience, the method comprising:
determining that a lifecycle event has occurred in a non-high availability bosh-based service provided by a multi-node cluster;
responsive to the lifecycle event, storing information about a role of a master node and timestamp information;
determining that a cluster deployment crash has occurred for the service; and
comparing timestamp information associated with multiple nodes to establish one of the nodes as the master node.

17. The medium of claim 16, wherein the bosh-based service is associated with a database.

18. The medium of claim 16, wherein the lifecycle event is associated with at least one of: (i) an initial first-time deployment, (ii) a failover occurrence, and (iii) a deployment update.

19. The medium of claim 16, wherein the timestamp information comprises a plaintext Coordinated Universal Time ("UTC") timestamp.

20. The medium of claim 16, wherein the timestamp information is stored on a persistent storage device such that it survives across reboots and crashes.

* * * * *